(12) United States Patent
Tiegs

(10) Patent No.: US 7,617,063 B2
(45) Date of Patent: Nov. 10, 2009

(54) REMOTE WITNESS TESTING SYSTEM

(76) Inventor: Paul Tiegs, P.O. Box 743, Beaverton, OR (US) 97075

( * ) Notice: Subject to any disclaimer, the term of this patent is extended or adjusted under 35 U.S.C. 154(b) by 47 days.

(21) Appl. No.: 11/333,962

(22) Filed: Jan. 17, 2006

(65) Prior Publication Data

US 2006/0187843 A1    Aug. 24, 2006

Related U.S. Application Data

(60) Provisional application No. 60/644,769, filed on Jan. 18, 2005.

(51) Int. Cl.
*G06F 17/00* (2006.01)
*G06F 19/00* (2006.01)

(52) U.S. Cl. .................... 702/108; 702/122; 702/188; 348/14.01; 348/14.04

(58) Field of Classification Search ............. 702/108, 702/122, 188; 374/8, 45, 57
See application file for complete search history.

(56) References Cited

U.S. PATENT DOCUMENTS

| | | | | |
|---|---|---|---|---|
| 5,975,531 A * | 11/1999 | Rebec et al. | ............... | 375/240 |
| 6,055,487 A * | 4/2000 | Margery et al. | ............... | 702/84 |
| 6,104,988 A * | 8/2000 | Klarer | ............... | 702/183 |
| 6,671,520 B1 * | 12/2003 | Kim | ............... | 455/556.1 |
| 7,183,115 B1 * | 2/2007 | Lauglin | ............... | 436/38 |
| 2002/0133749 A1 * | 9/2002 | Petersen et al. | ............... | 714/27 |
| 2002/0172931 A1 | 11/2002 | Greene et al. | | |
| 2003/0041286 A1 | 2/2003 | Boorom et al. | | |
| 2003/0140279 A1 | 7/2003 | Szucs et al. | | |
| 2003/0212893 A1 * | 11/2003 | Hind et al. | ............... | 713/177 |
| 2003/0216891 A1 * | 11/2003 | Wegener | ............... | 702/188 |
| 2004/0093516 A1 * | 5/2004 | Hornbeek et al. | ............... | 713/201 |
| 2004/0138840 A1 | 7/2004 | Wolfe | | |
| 2006/0009944 A1 * | 1/2006 | Shah et al. | ............... | 702/123 |
| 2006/0075065 A1 * | 4/2006 | Renkis | ............... | 709/217 |
| 2006/0225113 A1 * | 10/2006 | Walker et al. | ............... | 725/105 |

OTHER PUBLICATIONS

International Search Report for International (PCT) Patent Application No. PCT/US2006/01851, mailed Oct. 10, 2007.
Written Opinion for International (PCT) Patent Application No. PCT/US2006/01851, mailed Oct. 10, 2007.
International Preliminary Report on Patentability for International (PCT) Patent Application No. PCT/US2006/01851, mailed Aug. 7, 2008.

* cited by examiner

*Primary Examiner*—Hal D Wachsman
(74) *Attorney, Agent, or Firm*—Rylander & Associates PC; Kurt M. Rylander; Mark E. Beatty

(57) ABSTRACT

A master testing control system includes at least one remote computer with one or more communications lines for communicating over a communications network and a plurality of remote sensors, a two way real-time digital video system, a two-way real-time digital audio system. A set of instructions is on each remote computer for sending and receiving data over one or more data lines and for remote display. A set of instructions is on each remote computer for displaying data. At least one local computer is located geographically distant from the remote computer and able to monitor and control the display, storage, and transmission of data acquired by the remote computer. The remote computer collects data from the plurality of sensors and transmits this data to the local computer, under the control of the local computer, for permanent recording.

12 Claims, 3 Drawing Sheets

REMOTE WITNESS TESTING SYSTEM

CROSS-REFERENCE TO RELATED APPLICATION

The present application claims the benefit of and priority to prior co-pending U.S. Provisional Patent Application Ser. No. 60/644,769 filed on Jan. 18, 2005.

FIELD OF THE INVENTION

The present invention relates to data collection, transfer, and storage over a communications network. More particularly, this invention relates to a test data monitoring, storage, and control system useful for conducting certification testing procedures remotely over a secure communications link, thus allowing third parties to witness tests conducted at a site remote from the location of the third party witness.

BACKGROUND

There is a segment of the technical services business sector that deals with providing independent, "third party" testing and certification of a broad range of consumer and commercial products. Test standards and certifications for these products range from verification-of-product-origins to compliance with product safety specifications and environmental impact potentials. Product test standards and certifications are required by many governmental laws, regulations, or codes before some products can be installed for use or even being offered for sale in some jurisdictions.

Typical product testing is provided by laboratories accredited by appropriate jurisdictionally specified and approved agencies for performing the specialty types of testing required for the product. A new product model or design is submitted by its developer to the laboratory where tests are conducted in accordance with prescribed test standards or in accordance with specific standard scientific and engineering experimental methods. If a product meets the specifications prescribed by a test standard and/or the applicable laws, regulations, or codes, the laboratory certifies the results. Laboratory certification of a product is most typically conveyed by written documentation, laboratory-controlled trademark labeling, product specification literature, and/or published information in product user manuals.

It is common practice for product developers in the United States and Canada to have their own laboratory testing facilities with all of the appropriate equipment and expertise for performing many and sometimes all of the applicable test standards their new products have to meet. This way, the developer can perform their own testing to be certain a new product will pass the required tests before it is submitted for accredited, third-party testing, and certification. Because these developer-owned laboratories are fully equipped with appropriate test equipment, it has also become common for the third-party accredited laboratory to send a test-engineer employee of the third-party accredited laboratory to the developer's laboratory for conducting product certification testing. This practice, where the third-party accredited laboratory provides the test-engineer employee and the developer provides the fully equipped laboratory facilities for product testing and certification has become known as "witness testing."

A drawback of present witness testing programs is that they require the "witness" test engineer to be physically present to verify the setup and the conduct of the test, and to sign off on all results. This can entail expensive travel. This can also entail expensive delays in testing, as a customer may have to delay testing until the witness test engineers are available, which can lead to increased development costs and delays in introducing products to market. If any problems are encountered in test setup or preparation, then this might require that the witness test engineers prolong their stay at the test location, again increasing costs. Conversely, if the witness test engineers are unable to extend their stay at a test location when problems are encountered, due to conflicts with other scheduled testing or other reasons, then the entire testing program might have to be delayed until the witness test engineers can return. Again, these testing delays can cause delays in product development and introduction into the market with consequently significant cost penalties.

Creating a witness testing system that permits witness test engineers to monitor all aspects of the test procedure from their own desks on a computer would avoid most of the need for traveling to and from test sites, thus saving traveling expenses and time. A witness testing system that permitted such a virtual presence would also minimize costs incurred due to problems encountered in the testing program, since witness test engineers would not be required to stay at a test site while corrections are made, and they could more easily reschedule the testing program.

SUMMARY AND ADVANTAGES

A remote witness testing system includes a test apparatus with a plurality of sensors to monitor designated test parameters; data acquisition devices to convert the sensor signal information into an electronic format that can be stored and manipulated by a digital computer; a remote digital computer co-located with the test apparatus in electronic communication with said data acquisition devices which is also connected to one or more two-way communications networks, said remote computer containing instructions for display, storage and transmission of data from the data acquisition devices; a local digital computer co-located with a designated test witness in electronic communication with the remote digital computer over a communications network, said local digital computer containing instructions for display, storage, and verification of test data; a two-way real-time digital video connection with cameras and terminals at the remote test location and the local test witness; and a two-way real-time digital audio connection co-located with the video cameras and terminals.

The remote witness testing system includes a number of advantages, including (1) provides all of the data collection and test specification monitoring needed for demonstrating and recording compliance with the test standards being performed without the at-site physical presence of a third-party accredited test-engineer employee; (2) integrates calibrated and verified test data monitoring, transmission, and recording system, a video imaging, transmission, and recording system, an on-site/off-site test communications recording system, and a data transmission security system for maintaining the confidentiality of test and sensitive product information; (3) test procedures conducted by the product developer in their own laboratory can be directed, monitored, and recorded by a third-party accredited laboratory test-engineer employee located anywhere in the world; (4) allows a third-party accredited laboratory test-engineer employee to have a "virtual presence" for directing and performing tests and certifying test results.; (5) maintains the third-party and independent tester status required by accreditation agencies; (6) can utilize the World Wide Web via the Internet or dedicated two-way electronic communications systems for transmission of test procedure directives and test video, audio, and data results; (7) provides a new, better, more cost-effective method for performing tests requiring verification by witnesses; (8) provides an apparatus and method for conducting testing that does not require witnesses to be at-site, physically present; (9) harnesses developments in modern communications technology to permit real-time verifiable test monitoring and data collection from a remote location, which avoids the expense and complication of requiring witness engineers and customers to travel to test sites to be physically present to witness tests.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Figure 1:
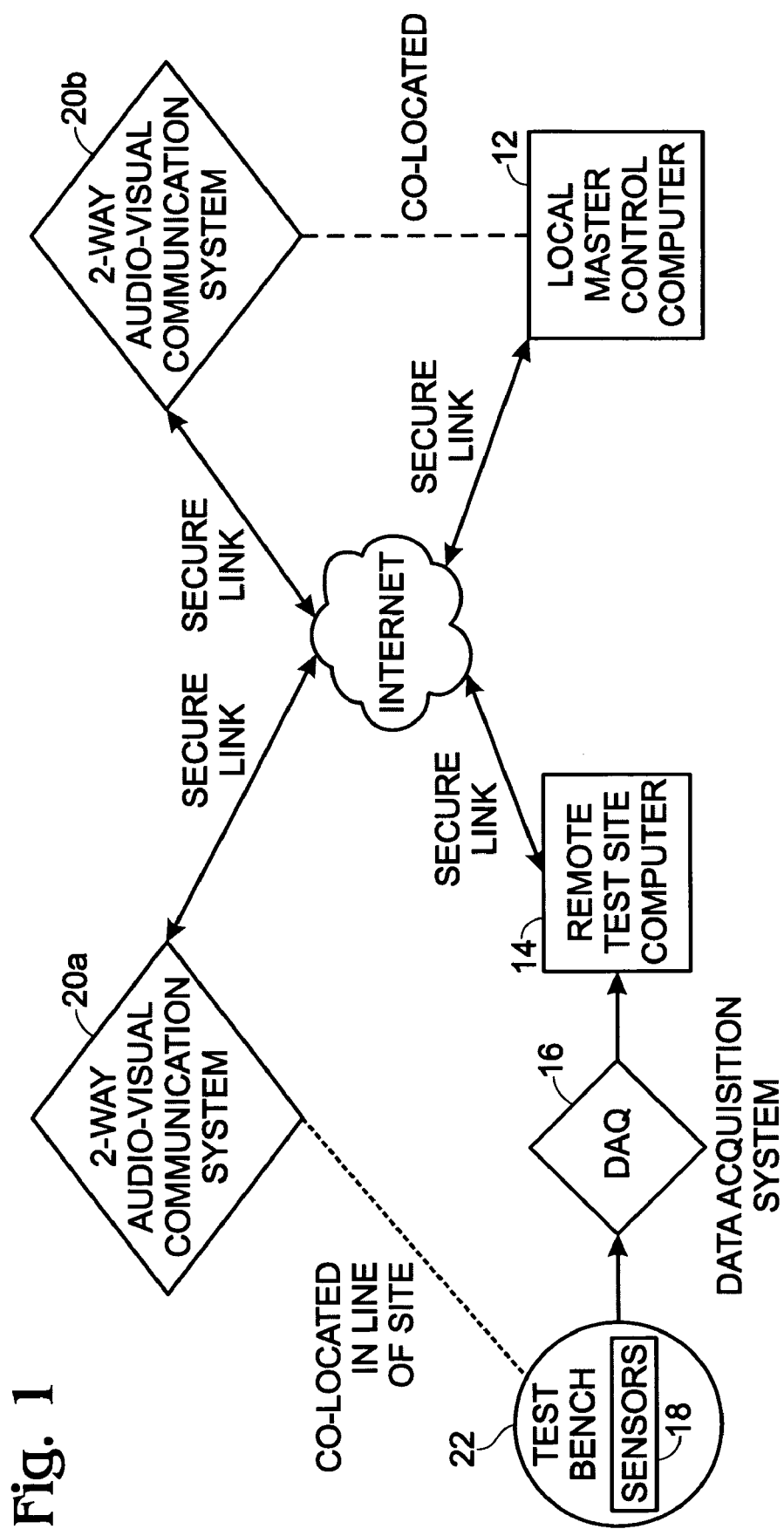
FIG. 1 shows the basic scheme of the inventive system.

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

The present invention provides apparatus and methods for performing witness testing without the witness being physically present at the test site.

The present invention may be implemented by one or more devices that include logic circuitry. The device performs functions and/or methods as are described in this document. The logic circuitry may include a processor that may be programmable for a general purpose, or dedicated, such as a microcontroller, a microprocessor, a Digital Signal Processor (DSP), a Programmable Logic Controller (PLC), and other similar processors. For example, the device may be a digital computer-like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical and other physical signals to generate other desired physical signals.

The invention additionally provides programs, and methods of operation of the programs. A program is generally defined as a group of steps leading to a desired result, due to their nature and their sequence. A program includes a writing which sets forth instructions which can direct the operation of an automatic system capable of storing, processing, retrieving, or transferring information. A program made according to an embodiment of the invention is most advantageously implemented as a program for a computing machine, such as a general-purpose computer, a special-purpose computer, or a microprocessor.

The invention also provides storage media that, individually or in combination with others, have stored thereon instructions of a program made according to the invention. A storage medium according to the inventions is a computer-readable medium, such as memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example, electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, individually or in groups.

Often, for the sake of convenience only, it is preferred to implement and describe a program as various interconnected distinct software modules or features, individually and collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer readable medium, it should be clear to a person skilled in the art that it need not be a single memory, or even a single machine. Various portions, modules or features of the program may reside in separate memories, or even separate machines. The separate machines may be connected directly, or through a network, such as a Local Area Network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

The present invention utilizes information from sensors installed on a test apparatus. These sensors measure physical parameters of the test apparatus at various locations, such as: temperature, pressure, flow rate, viscosity, force, strain, displacement, vibration, electromagnetic emissions, or other parameters which can be measured directly or indirectly, through contact or non-contact means.

The present invention utilizes data acquisition and signal conditioning devices which convert electrical signals from physical sensors into a type and format usable by a digital computer for storage, display and transmission. The data acquisition devices may include means for providing necessary voltage and control signals to sensors, boosting the strength of sensor output signals, filtering out unwanted interference, and/or converting analog sensor outputs into digital form, and transmitting these conditioned signals to a computer for manipulation and storage. It will be understood by persons skilled in the art that these data acquisition and signal conditioning functions can be performed in any number of ways. Individual sensors may be wired directly to multi-channel devices that perform all the necessary conditioning and conversion for a plurality of sensors of various types, and which in turn transfers this data to a general purpose computer via a direct connection or a communications network in digital format readily by commonly available spreadsheet or database software such as MICROSOFT EXCEL™, MICROSOFT ACCESS™ or BORLAND QUATTRO™. Alternatively, a sensor may be wired to a separate dedicated controller providing some or all of the signal conditioning and data acquisition functions, and which then communicates directly with a general purpose computer via a dedicated communication line, a separate communications loop and communications module (e.g. MELSECNET™), or over a network such as a LAN, WAN, or the Internet. Communications could also be accomplished via wireless radio frequency or optical links.

The present invention may be implemented as computer software on a conventional computer system. Conventional computer systems include a processor which retrieves and executes software instructions stored in storage such as memory, which may be Random Access Memory (RAM) and may control other components to perform the present invention. Storage may be used to store program instructions or data or both. Storage, such as a computer disk drive or other non-volatile storage, may provide storage of data or program instructions. In one embodiment, storage provides longer term storage of data and instructions, with storage providing storage for data or instructions that may only be required for a shorter time than that of storage. Input devices such as computer keyboards, mouses, touch panels, device-specific function keypads, or other suitable means allow user input to the system. Output devices, such as display terminals, touch panels, printers, or LED displays, or other suitable means, allow the system to provide information such as instructions, data or other information to the user of the system. Storage input devices such as conventional floppy disk drives, CD-ROM drives, or FLASH memory card slots, among others, accept input from computer program products such as a conventional floppy disk, CD-ROM, FLASH memory card, or other nonvolatile storage media that may be used to transport computer instructions or data to the system. Computer products or devices such as CD-ROMs and floppy disks that have encoded thereon computer readable program code, data, or both, are used to configure the computer system to operate as described below.

As shown in FIG. 1, the remote witness testing system includes a local computer 12 (the Master Measurement and Recording Control System) at the location of the third party witness which monitors and controls the test and stores or saves relevant test data; a remote computer 14 (the Site Measurement System Controller) at the remote test site which uses data acquisition hardware 16 and software to interface with sensors 18 measuring the physical parameters of the test; and a two-way audiovisual communications system 20a, 20b that permits the witness to visually monitor the correct placement of sensors and verify correct conduct of the test procedure in real time or near real time. The two-way audiovisual communications system 20a, 20b also permits video conferencing to discuss test procedures and troubleshoot problems with the test. Secure two-way communications links between the local computer 12 and the remote test site computer 14, and the local computer 12 and the video communications system 20a, 20b, allow the local computer 12 to control and monitor both the remote test site computer 14 and the video system 20a, 20b; and, a remote test site test apparatus 22 in which the actual testing is conducted, with sensors 18 installed to detect and transmit desired parameters to the data acquisition hardware 16 at the remote test site in analog or digital format.

Monitor and control by the local computer 12 are accomplished via a two-way communications link with the remote test site computer 14 and two-way video communications system 20a, 20b, using a networked connection such as through an Internet Provider (IP), a Local Area Network (LAN), a Wide Area Network (WAN), a dedicated two-way communications line, or other similar means. For illustrative purposes the network is the World Wide Web via the Internet, an intranet, an extranet, or any other known network.

Figure 2:
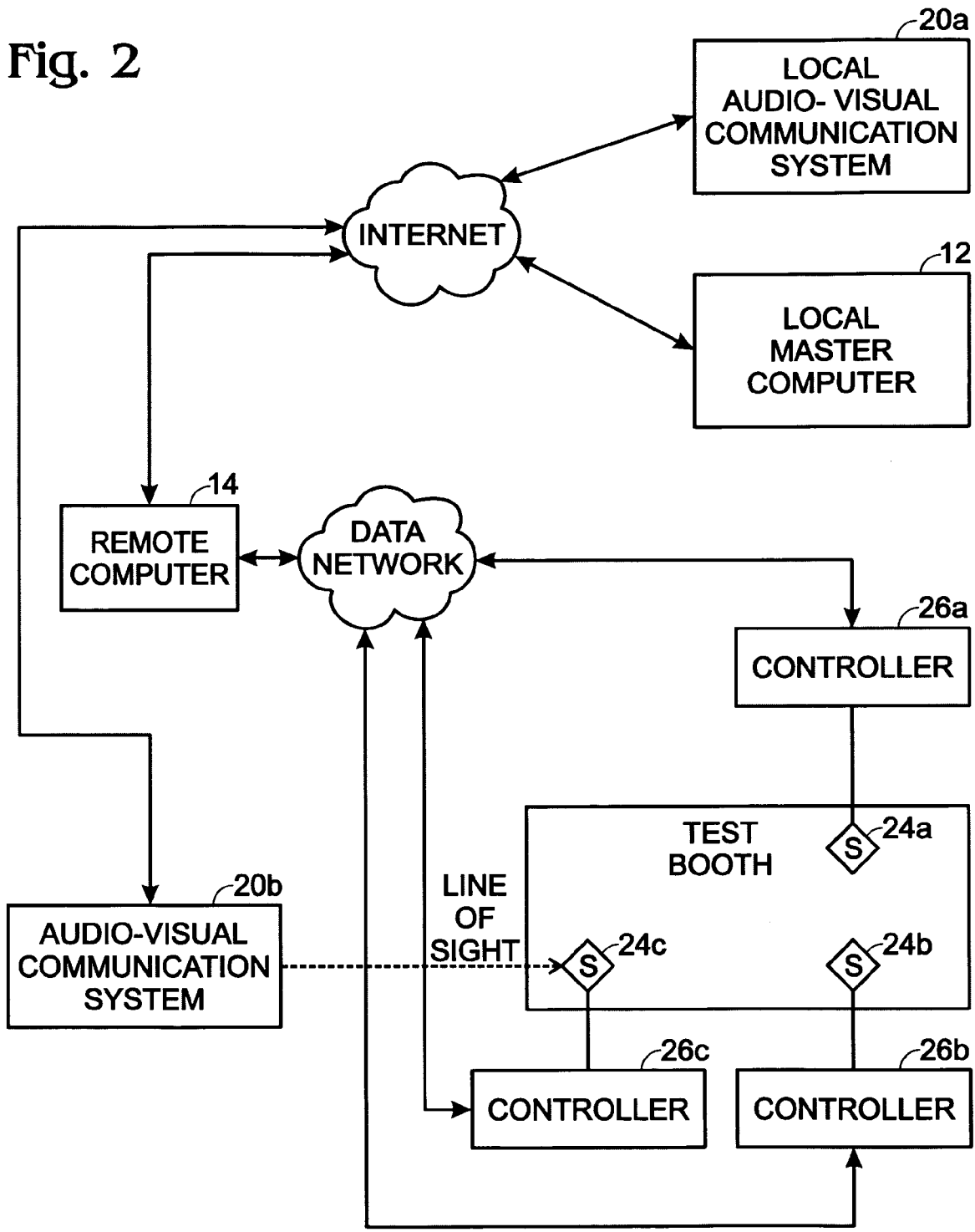
FIG. 2 shows another embodiment of the basic scheme of the inventive system.

An alternative embodiment of the basic configuration is shown in FIG. 2. The stand alone DAQ system of FIG. 1 is replaced by sensors 24a, 24b, 24c connected to sensor controllers 26a, 26b, 26c that have DAQ functionality built in them, which provide a digital output signal that is already in a format useable by a general purpose computer. Such sensors can communicate with the Remote Computer 14 via wiring in a dedicated communications loop, a wireless electromagnetic communications system, or via an open communications network such as the Internet.

A hybrid system comprising all of these alternatives or other alternatives could also be utilized with this invention. A person of skill in the art will see that the Virtual Witness Testing System is not limited to a single configuration or technology, but is applicable to a virtually limitless arrangement of sensor and communications technologies.

The embodiments described below are intended to be illustrative only. Applicant intends to encompass within the language any structure presently existing or developed in the future that performs the same function.

First Embodiment—Thermal Testing

Figure 3:
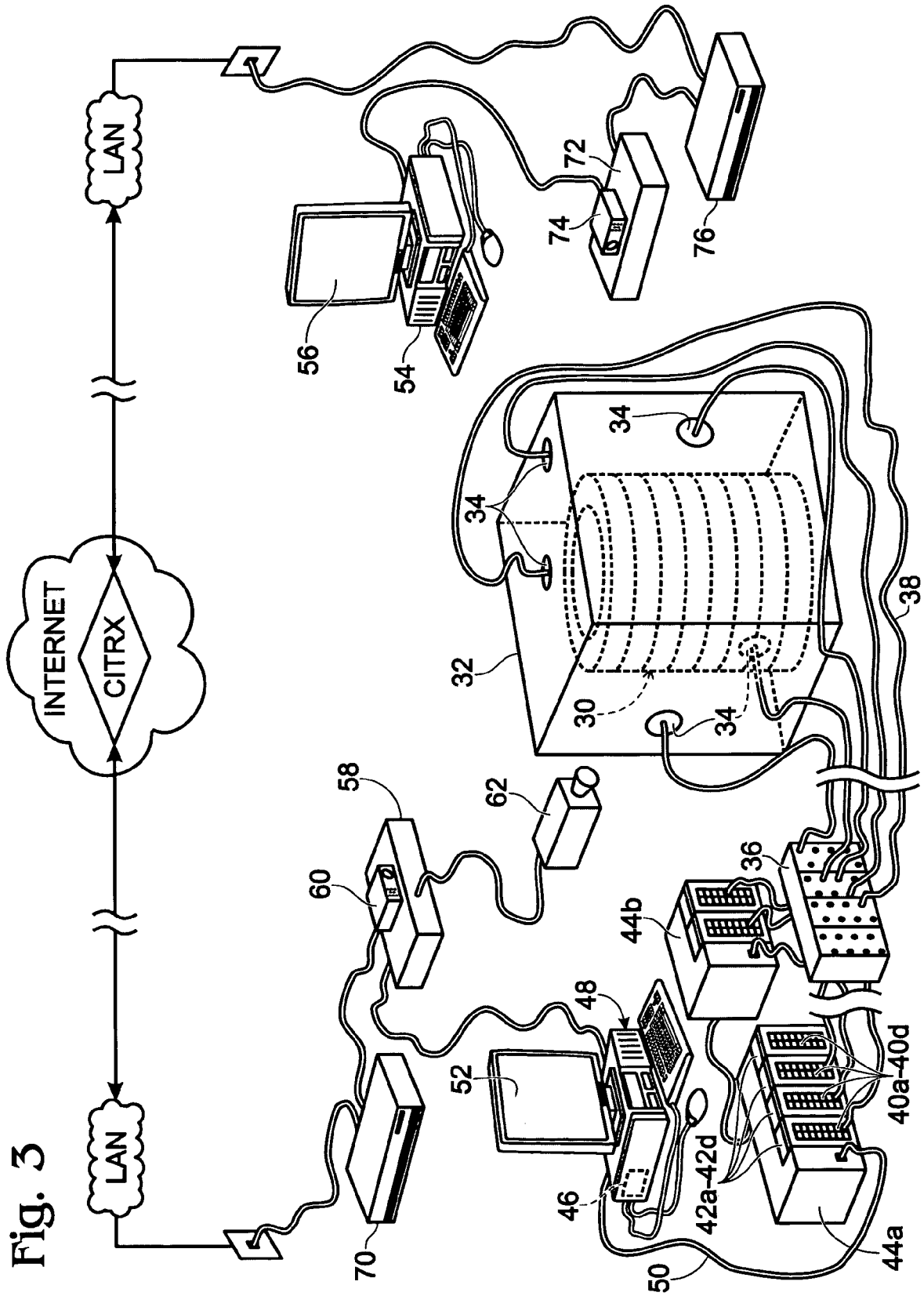
FIG. 3 shows an embodiment set up for thermal testing of space heating appliances.

One embodiment of the remote witness testing system is shown in FIG. 3. This embodiment is configured to perform testing of consumer heating appliances to ensure compliance with building safety code standards mandated by various agencies in the United States, Canada, and Europe. The specific test procedures vary somewhat from standard to standard, but the basic testing scheme is the same. The appliance to be tested 30 is set up in a testing structure or "booth" 32 built for this type of thermal testing. A plurality of K-type thermocouple sensors (TC) 34 are mounted on the appliance 30 and at various locations inside the booth 32, as specified by the particular standard. The appliance 30 is then fired with appropriate fuel while temperatures are recorded at test-standard-specified time intervals until temperatures of key test appliance components have stabilized or reached equilibrium, usually defined as three consecutive temperature readings within 1° to 3° F. (0.5 to 1.7° C.).

Data Acquisition System

The TC's 34 are connected to several multi-port jack panels 36, with impedance calibrated for K-type thermocouples, via 500 foot K-type TC cables 38 of 24 AWG thickness. The jack panels 36 in this embodiment are 19-inch jack panels with 120 female jack plugs per panel, which can be purchased commercially from OMEGA ENGINEERING™. The jack panels 36 provide convenient means for terminating the TC wiring, with the number of panels dependent upon the number of TC sensors 34 to be connected. Each jack in a jack panel is tied into one channel of a multi-channel isothermal terminal block 40a, 40b, 40c, 40d, mounted to the front of its corresponding multi-channel TC amplifier SCXI™ modules 42a, 42b, 42c, 42d. The isothermal terminal blocks 40a, 40b, 40c, 40d in the present embodiment are model SCXI-1303™ 32-channel isothermal terminal blocks from National Instruments Corporation, Austin, Tex. The isothermal terminal blocks 40a, 40b, 40c, 40d minimize temperature differences between the terminal connectors of the two TC wire leads that can cause errors and provide a constant reference junction temperature to minimize errors due to terminal connecter and ambient heating. Each individual channel of terminal blocks 40a, 40b, 40c, 40d is coupled to a corresponding individual channel of TC amplifier modules 42a, 42b, 42c, 42d, which amplify the voltage from the TC 34 and filter the voltage signals to eliminate electrical noise. The TC amplifier modules 42a, 42b, 42c, 42d are constructed as electronic modules that are conveniently installed in "slots" of data acquisition system (DAQ) chassis 44a, 44b. The TC amplifier modules 42a, 42b, 42c, 42d are model SCXI-1102™ 32-channel amplifier modules from National Instruments Corporation, Austin, Tex. installed in model SCXI-1000K™ chassis 44a, 44b, from National Instruments Corporation, Austin, Tex., with slots for up to four multi-channel modules 42a, 42b, 42c, 42d in each chassis. The DAQ system chassis 44a, 44b automatically recognize what type of module is installed in each slot—e.g. a TC module, an electrical current measurement module, a strain-gage module, or other suitable modules—and provide the necessary power and communications connections to that module so that the user is not required to engage in time consuming and expensive work to manually configure each module for the particular instruments being supported. The DAQ system chassis 44a, 44b also help shield the installed modules from unwanted electro-magnetic interference. The DAQ system chassis 44a, 44b automatically route conditioned TC signals to an internal communications bus with necessary channel address information based on control and timing commands generated by the DAQ input/output (I/O) electronic card 46 installed in the remote computer 48. Up to thirty-two SCXI-1000K chassis 44a, 44b may be linked together to provide hundreds of channels of data from various types of sensors, with all controlled by a single I/O card 46. In the present embodiment set up for testing residential heating appliances some testing standards require monitoring up to 224 channels of TC data, so two SCXI-1000K chassis 44a, 44b are linked, providing up to 256 channels of TC data.

The DAQ system chassis 44a, 44b are connected via a shielded cable 50 with an RS-232 connector to the Remote computer 48, through the I/O card 46. The Remote computer 48 in this embodiment is a general purpose personal computer (PC) with a DAQ I/O card 46 installed, such as the model PCI-6034E DAQ I/O card available from National Instruments Corporation, Austin, Tex., along with software instructions necessary to interface with the I/O card 46. The I/O card 46 contains a circuit board with various solid state circuit components and microprocessor chips which together perform a number of functions. The I/O card 46 converts the analog TC signals to digital format which can easily stored and manipulated by a digital computer, automatically configures communications with the SCXI-based DAQ devices, provides control signals to the DAQ chassis 44a, 44b determining which channel of information is to be fed to the communications bus at a given time and what type of signal conditioning functions and in what magnitude each module should apply to the analog sensor signals, and other functions. The I/O card 46 also provides the ability to chop sensor input signals permitting more detailed analysis by the user. The I/O card 46 can be easily configured and controlled through the Remote computer 48 using commercially available data acquisition software programs such as LABVIEW™ from National Instruments Corporation, Austin, Tex.

Remote Computer

The Remote computer 48 in the present embodiment utilizes an microprocessor operating at 333 mega-hertz (MHz), such as the PENTIUM4™ from Intel Corporation, Santa Clara, Calif., a hard drive memory storage device with 40 gigabytes (GB) of memory capacity, 128 megabytes (MB) of Double Data Rate Synchronous Dynamic Random Access Memory (DDR SDRAM), a compact disk readable-writable drive (CD-RW), an RS-232 compatible communications port, a 10/100 Ethernet communications card to permit communications over a data network, and a flat panel display 52. The Remote computer 48 further has at least two available expansion slots, one of which is occupied by the I/O card 46, the other of which is occupied by a video capture card, such as a VIDEUM™ 1000 PLUS™ video capture card from WINNOV of Santa Clara, Calif. The Remote computer 48 has an operating system, such as the WINDOWS XP™ operating system from MICROSOFT Corporation of Redmond, Wash., and has software necessary to communicate over the Internet, such as INTERNET EXPLORER™ browser from MICROSOFT Corporation of Redmond, Wash. or other suitable software. A person skilled in the art will recognize that the inventive system is not limited to these parameters. The invention could utilize general purpose computers such as MACINTOSH™ series of computers from Apple Computer, Inc. of Cupertino, Calif., or could run on PC computers utilizing UNIX™ or LINUX™ operating systems. The invention could also use a computer of greater or lesser performance level depending on the requirements of the DAQ system, or other hardware or software requirements. The described embodiment utilizes a relatively standard and readily available computer of moderate cost that has the capacity to interface with a DAQ system which the inventor is most familiar with, such as the DAQ system from National Instruments Corporation of Austin, Tex.

Data Acquisition Software

The Remote computer 48 contains software instructions that permit the user to interface with the DAQ system and manipulate the sensor data gathered by displaying and storing data from the DAQ system, sending commands to the DAQ system, and permitting the sensor data to be stored, arranged, and displayed in the desired manner and format. Many data acquisition software programs are available commercially. DAQ software permits the user to apply complex statistical algorithms to the data in order to more easily analyze the data. DAQ software also permits the user to display test data via in an easily understood format on a viewing terminal or printer, and to store test data on media in an easily retrievable format, such as the computer hard drive or removable storage media, or transmit the data over a communications network such as the Internet. DAQ software can store data in spreadsheet formats such as MICROSOFT EXCEL™ or in database formats such as MICROSOFT ACCESS™.

Alternatively, users may choose to write their own software to interface with sensors and data acquisition hardware and to display, store, and analyze sensor data. The inventive system is quite flexible and provides for use of any suitable hardware/ software configurations depending on the needs of the user based upon the nature of the testing to be performed, the resources available to the user, and the knowledge and experience of the user. The inventors have found that it is often more convenient and efficient to utilize commercially available software programs, as in the embodiment described here, but a person skilled in the art will recognize that the inventive system can incorporate many suitable software programs or combinations thereof to accomplish the tasks, both commercially available or custom written.

The LABVIEW™ software used in the present embodiment is a user-friendly program with a graphical programming interface which allows the user to control the DAQ device module 42a, 42b, 42c, 42d, chassis 44a, 44b, and I/O card 46, as well as automatically display and store test data, with test specific identifiers and date-time stamping. LABVIEW™ also provides the ability to produce customized reports, and store data in formats useable by commonly available spreadsheet and data base software programs such as MICROSOFT EXCEL™, MICROSOFT ACCESS™, LOTUS 1,2,3™, and others. LABVIEW™ also permits incorporation of digital audiovisual data as part of its data logging features. While the LABVIEW™ software provides many practical advantages in this embodiment a person of skill in the art will recognize that many off-the-shelf data acquisition software programs could accomplish the same purpose, as well as software programs custom written by the user or others for a particular test procedure or device configuration.

Local Computer

A local computer 54 at the third party testing certifier location provides monitor and control functions to the certifying test engineer as well as data recording control. The local computer 54 in this embodiment comprises a digital computer with an microprocessor operating at a minimum of 333 mega-hertz (MHz), such as an Intel Pentium4, at least 128 mega-bytes (MB) of double-data-rate synchronous dynamic random access memory (DDR SDRAM), a 10/100 Ethernet communications card and a network communications port, a 48 times-overspeed read-write compact disk (48X CD-RW) drive, at least one RS-232 compatible communications port, a hard drive for data storage of at least 40 MB capacity, and at least one visual display monitor 56. The local computer 54 also includes a video capture card, such as a WINNOV™ VIDEUM™ 1000 PLUS™ video capture card. The local computer 54 in the present embodiment utilizes the MICROSOFT WINDOWS™ XP™ operating system.

Audiovisual Communications System

The inventive system utilizes a secure, two-way digital audiovisual communications system with which serves several functions: 1) it provides virtual face-to-face communications between the witnessing Test Engineer—co-located with the Local Computer—and the persons at the remote test site actually conducting the test; 2) it provides the ability for the witnessing Test Engineer to visually observe the physical arrangement of the appliance to be tested 30 within the test booth 32 and the placement of the sensors 34; 3) it allows the witnessing Test Engineer to visually verify the type/model/ serial number of the sensors 34 used for the testing as well as any calibration labels on these sensors; and, 4) it permits the witnessing Test Engineer to visually observe the conduct of the test to ensure proper test procedures are employed. By utilizing a secure communications connection, either by encryption of transmissions or other means, the parties are able to maintain confidentiality over the devices being tested as well as the test results.

The present embodiment utilizes digital video conferencing system, such as the VIEWSTATION™ H.323 digital video conferencing systems from Polycom, Inc. of Pleasanton, Calif., to provide two-way, real-time audio-visual communications between the Remote Test Site and the Testing Engineer located at the Local Computer 54 via the Internet. The VIEWSTATION™ H.323 includes the computer processor and controller 58 with an attached digital camera/microphone device 60. At least one digital video conferencing system 58, 60 is co-located with the remote computer 48 and video monitor 52, and at least one other digital video conferencing system 72, 74 is co-located with the local computer 54 and display monitor 56.

At least one additional digital video camera 62, such as the model EVI D100™ digital video camera available from Sony Corporation of America of New York, N.Y., is co-located with the test booth 32 with a view of the test area and which can be easily repositioned to observe different aspects of the test area as necessary. The additional digital video camera 62 is connected to the remote test site digital video conferencing system 58 and is co-located with the test booth 32 so as to provide a view of the test booth. Orientation of the digital camera 62 is controllable from the local computer 54.

The digital video conferencing systems 58, 72 connect to a LAN providing connectivity to the Internet via a 2-port Ethernet appliance that transmits audio-video signals over packet based networks such as the Internet and provides encryption of audio-visual transmissions for security over IP, without changing your existing network or camera, such as the model EASY-VC E107™ Ethernet appliance from Bulldog Information Services of Tuscon, Ariz. 70, 76. The present embodiment utilizes computers 48, 54 with installed video capture cards, such as the WINNOV VIDEUM 1000 PLUS™ video capture cards, and flat panel display monitors 52, 56 to provide video display and menu-based control of the connected remote digital video conferencing system 58, 60 and video camera 62, as well as the local digital video conferencing system 72, 74. The video capture card permits the computer to control operations of the cameras 60, 62, 74 such as pan, tilt, zoom, brightness, hue and other features, as well as choosing the format of the video feed to provide streaming video or video compression for saving to storage media. For test procedures requiring records of visual verification the suitable software, such as the LABVIEW™ software, provides capability to save the compressed audiovisual data along with other sensor data.

Control of the Remote Computer

The Remote computer 48 transmits sensor and audiovisual data to the Local Computer 54 via a secure communications link, preferably the Internet. The Remote computer 48 and Local Computer 54 in the present embodiment are connected to the Internet via LANs and have all necessary software instructions for operating on the Internet via a LAN. The Remote computer 48 and Local Computer 54 contain software which permits encrypted data transmission and storage, and may utilize additional security features such as password access control to the operating system and specified data files stored on the computer memory if necessary.

The witness Test Engineer controls the test through the Local Computer 54. Using the secure two-way communications link the local computer 54 monitors and stores all sensor data acquired by the remote test site computer 48. The Remote Computer 48 is controlled by the Local Computer 54 at least during the data collection phase of the testing procedure. During the conduct of the test the Local Computer 54 is able, at a minimum, to monitor and display all of the test-related data that the Remote Computer 48 is able to monitor and display, and to control the Remote Computer's 48 data transfer and file sharing operations. Only the Local Computer 54 is permitted to save test data on permanent storage media during the conduct of the test. The present embodiment utilizes a third party Internet service, such as GoToMyPC.com from Citrix Systems, Inc. of Fort Lauderdale, Fla., to provide control of the Remote computer 48 by the Local Computer 54. This third party service provides encrypted connections over which one computer, designated the master computer, can see what is displayed on a designated slave computer and control the slave computer using the master computer's input/output devices (e.g. keyboard, mouse, display monitor, printer). In the present embodiment the Local Computer 54 acts as the master computer and the Remote Computer 48 acts as the slave computer. A person skilled in the art will recognize that other methods could be used to achieve remote operation of the Remote computer 48 by the Local Computer 54.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A remote witness testing system, comprising:
   a test apparatus including a thermal testing booth to substantially enclose a heating appliance, the test apparatus further including a plurality of sensors to monitor designated test parameters, said plurality of sensors to produce signal information corresponding to data;
   one or more data acquisition devices to convert the sensor signal information into an electronic format that can be stored and manipulated by a digital computer;
   a remote digital computer co-located with the test apparatus in electronic communication with said one or more data acquisition devices and in electronic communication with one or more two-way communications networks, said remote digital computer to display, and transmit data from the one or more data acquisition devices;
   a local digital computer co-located with a designated test witness in electronic communication with the remote digital computer over the one or more two-way communications networks, said local digital computer to display, permanently store, and verify test data;
   a two-way real-time digital video connection including one or more video cameras and terminals at each of the remote digital computer location and the local digital computer location;
   and a two-way real-time digital audio connection co-located with the one or more video cameras and terminals.

2. The remote witness testing system of claim 1, the local digital computer to further certify the test data.

3. The remote witness testing system of claim 1, the local digital computer to further record compliance with one or more test standards.

4. The remote witness testing system of claim 1, the plurality of sensors further comprising:
   a plurality of thermocouples coupled to one of the heating appliance, the interior of the thermal testing booth, or a combination thereof.

5. A test system comprising:
   a thermal test booth to substantially enclose a thermal appliance;
   a test module including one or more thermal sensors coupled to the thermal appliance, the thermal test booth, or a combination thereof to detect one or more test parameters of a test for the thermal appliance; and
   a remote witness module coupled to the test module and located remotely from the test module to monitor the one or more test parameters, the remote witness module to verify the one or more test parameters.

6. The test system of claim 5, the remote witness module to further certify the one or more test parameters.

7. The test system of claim 6 further comprising:
   an audiovisual communication module coupled to the test module and the remote witness module to communicate audiovisual information pertaining to the test between the test module and the remote witness module.

8. The test system of claim 7, the remote witness module further comprising:
   a display module to display the one or more test parameters, the audiovisual information, or a combination thereof.

9. The test system of claim 8, the display module to display a test compliance with one or more test standards.

10. The test system of claim 7, the remote witness module further comprising:
    a recording module to record the one or more test parameters, the audiovisual information, or a combination thereof.

11. The test system of claim 10, the recording module to record a test compliance with one or more test standards.

12. The test system of claim 5, the one or more thermal sensors further comprising:
    one or more K-type thermocouple sensors.

* * * * *